(12) United States Patent
Feldman et al.

(10) Patent No.: US 12,705,044 B2
(45) Date of Patent: Aug. 11, 2026

(54) SYSTEM AND METHOD FOR FIRMWARE OR SOFTWARE UPDATES INCLUDING COST-BENEFIT ANALYSIS

(71) Applicant: Siemens Industry, Inc., Alpharetta, GA (US)

(72) Inventors: Daniel Feldman, New York, NY (US); Nico Fritsch, Forchheim (DE); Marlene Biehl, Atlanta, GA (US)

(73) Assignees: Siemens Industry, Inc., Alpharetta, GA (US); Siemens Aktiengesellschaft, Munich (DE)

( * ) Notice: Subject to any disclaimer, the term of this patent is extended or adjusted under 35 U.S.C. 154(b) by 69 days.

(21) Appl. No.: 18/446,709

(22) Filed: Aug. 9, 2023

(65) Prior Publication Data

US 2025/0053406 A1 Feb. 13, 2025

(51) Int. Cl.
*G06F 8/65* (2018.01)

(52) U.S. Cl.
CPC .................................... *G06F 8/65* (2013.01)

(58) Field of Classification Search
CPC ................................ G06F 8/65; G06Q 10/20
See application file for complete search history.

(56) References Cited

U.S. PATENT DOCUMENTS 10,534,599 B2 * 1/2020 Mowatt .................. G06F 9/451
10,878,106 B2 12/2020 Davidi et al.
10,878,353 B2 * 12/2020 Masters ................ G06F 9/5094
2003/0055663 A1 * 3/2003 Struble .............. G06Q 30/0211 705/14.13
2007/0169089 A1 * 7/2007 Bantz .................... G06F 9/4484 717/168
2011/0213508 A1 * 9/2011 Mandagere ........... G06F 9/5088 700/291
2017/0220332 A1 * 8/2017 Srinivasan ............ G06F 9/5094
2018/0217829 A1 * 8/2018 Mowatt ..................... G06F 8/71
2019/0325319 A1 * 10/2019 Antonio ................. G06N 20/00
2021/0004219 A1 * 1/2021 Delgado Campos ..... G06F 8/65
2021/0096846 A1 * 4/2021 Zhou .................. G06F 11/1004
2021/0149658 A1 * 5/2021 Cannon .................... G06N 3/04
2021/0397463 A1 * 12/2021 Schimon .............. G06F 3/0482
2022/0051111 A1 * 2/2022 Hadar ................. G06Q 10/063
2022/0101260 A1 * 3/2022 Karri ................ G06Q 10/08355
2022/0334818 A1 * 10/2022 McFarland, Jr. .... G06Q 10/063
(Continued)

FOREIGN PATENT DOCUMENTS

CN 116679643 A * 9/2023 ....... G05B 19/41885
JP 2007026204 A * 2/2007
WO 2022189064 A1 9/2022

*Primary Examiner* — Daxin Wu

(57) ABSTRACT

A system for a firmware update includes an industrial device, such as an electric vehicle charging device, with firmware, a central server with an interface configured to collect and process data from a data source, a network, wherein the industrial device and the central server are configured to communicate via the network, and a cost-benefit-analysis (CBA) module for performing a cost-benefit analysis, wherein the CBA module is configured via executable instructions to calculate relative costs for a firmware update of the industrial device utilizing the data from the data source, determine a relative benefit for the firmware update of the industrial device, and compare the relative costs to the relative benefit.

14 Claims, 4 Drawing Sheets

(56) References Cited

U.S. PATENT DOCUMENTS

2023/0082123 A1* 3/2023 Yamamoto ................ G06F 8/65
717/118
2024/0103832 A1* 3/2024 Chandrasekaran ..........................
G06F 11/1433
2024/0103844 A1* 3/2024 R ............................ G06F 8/656

* cited by examiner

SYSTEM AND METHOD FOR FIRMWARE OR SOFTWARE UPDATES INCLUDING COST-BENEFIT ANALYSIS

BACKGROUND

1. Field

Aspects of the present disclosure generally relate to systems and methods for firmware and/or software updates or installations including a cost-benefit analysis. More specifically, various embodiments relate to optimized firmware and/or software updates taking into consideration for example electricity costs and carbon dioxide ($CO_2$) emissions, in connection with for example over-the-air (OTA) deployment of firmware updates.

2. Description of the Related Art

Many industrial devices, such as for example modules of electric vehicle charging (EVC) equipment, programmable logic controllers (PLCs), human-machine-interface (HMI) devices, drives, switches etc., typically comprise (micro-) controllers or integrated circuits of various kinds, generally processor circuitries, and corresponding firmware for executing specific applications. Firmware is a specific class of software that provides control for the device's specific hardware and is stored in non-volatile memories.

Firmware of industrial devices, or generally devices that comprise firmware, such as embedded systems, need to be updated from time to time because for example applications or programs executed by the firmware have been improved or modified. Another reason to update firmware is for security purposes, for example to address reported security weakness or issues.

An over-the-air (OTA) update, also known as over-the-air programming or OTA programming, is an update to an embedded system that is delivered through a wireless network, such as Wi-Fi or cellular network. Various components may be updated via OTA, including a device's operating system, applications, configuration settings, or parameters like encryption keys.

Firmware or software updates consume resources both in terms of cellular bandwidth as well as electricity costs and $CO_2$ emissions derived from the electricity needed to perform an update. In some cases, the connectivity costs can be prohibitive. Thus, there may exist a need for an improved system and method for cost- and $CO_2$-optimized firmware/software updates.

SUMMARY

Various embodiments relate to optimized firmware and/or software updates taking into consideration for example electricity costs, network costs and carbon dioxide ($CO_2$) emissions. Such firmware or software updates may be deployed over-the-air (OTA), e.g., utilizing cellular network.

A first aspect of the present disclosure provides a system for a firmware update comprising at least one industrial device comprising firmware, a central server comprising at least one interface configured to collect and process data from a data source, a network, wherein the at least one industrial device and the central server are configured to communicate via the network, and a cost-benefit-analysis (CBA) module for performing a cost-benefit analysis, wherein the CBA module is configured via executable instructions to calculate relative costs for a firmware update of the at least one industrial device utilizing the data from the data source, determine a relative benefit for the firmware update of the at least one industrial device, and compare the relative costs to the relative benefit.

A second aspect of the present disclosure provides a method for a firmware update comprising collecting data from a data source, performing a cost-benefit analysis for a firmware update of at least one industrial device utilizing the data from the data, and initiating the firmware update for the at least one industrial device when a relative benefit is greater than relative costs for the firmware update.

A third aspect of the present disclosure provides a non-transitory computer readable medium encoded with processor executable instructions that when executed by at least one processor, cause the at least one processor to carry out a method for a firmware update as described herein.

DETAILED DESCRIPTION

To facilitate an understanding of embodiments, principles, and features of the present disclosure, they are explained hereinafter with reference to implementation in illustrative embodiments. In particular, they are described in the context of being systems and methods for firmware or software updates or installations on different devices or systems, for example on electric vehicle charging devices. Embodiments of the present disclosure, however, are not limited to use in the described systems, devices, or methods.

Figure 1:
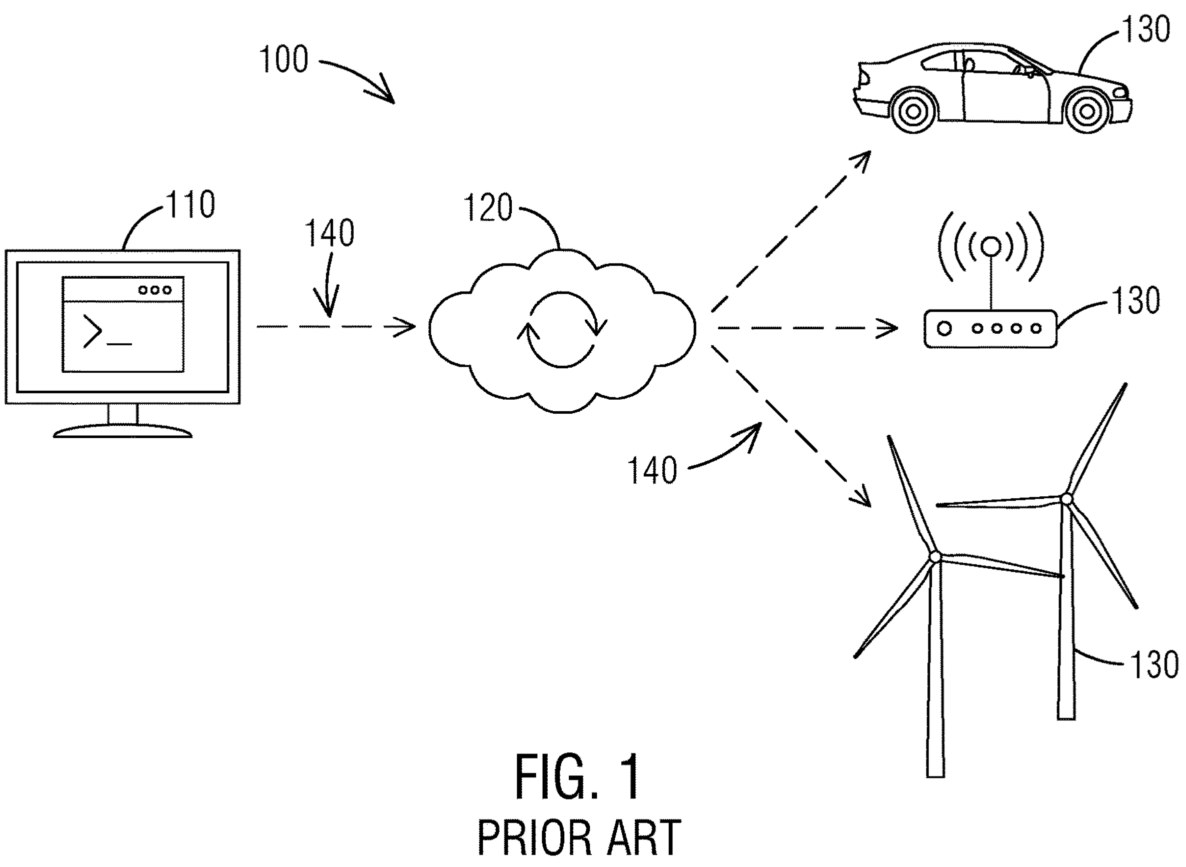
FIG. 1 illustrates a diagram of a known system for firmware updates in accordance with embodiments of the present disclosure.

FIG. 1 illustrates a diagram of a known system 100 for firmware updates in accordance with embodiments of the present disclosure. More specifically, system 100 is a system for OTA updates. As noted, an OTA firmware update is an update to an embedded system that is delivered through a wireless network, such as Wi-Fi or cellular network. Various components may be updated over-the-air, including a device's operating system, applications, configuration settings, or parameters like encryption keys.

The generic example system 100 illustrates a device management system 110, which is for example operated by a manufacturer, that issues a new firmware update or software update. The update is uploaded to the cloud 120 via a connection 140. In general, the cloud 120 refers to servers that are accessed over the Internet, and the software and databases that run those servers. Cloud servers are in data centers all over the world. Cloud computing enables users/organizations to access and store information without managing their own physical devices or IT infrastructure.

The update is queued, downloaded, and verified by a target device 130 over a mobile connection 140, for example cellular connection. Target devices 130 include for example vehicles, electric/electronic devices or systems, industrial facilities, etc. The mobile connections 140 are secure connections that are encrypted by one or more security protocols to ensure security of the data flowing between the different systems.

Figure 2:
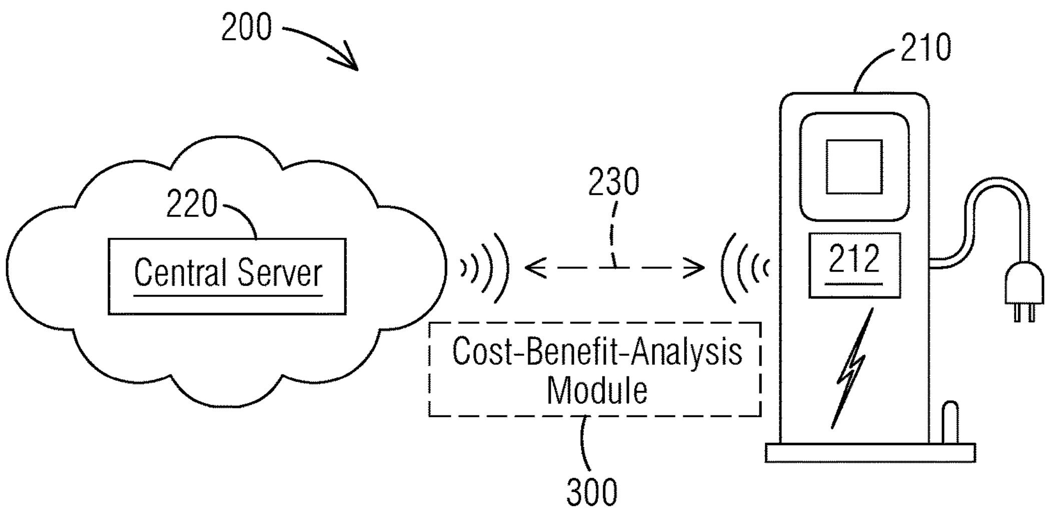
FIG. 2 illustrates a diagram of a system for an optimized firmware update in accordance with an exemplary embodiment of the present disclosure.

FIG. 2 illustrates a diagram of a system 200 for an optimized firmware update in accordance with an exemplary embodiment of the present disclosure.

In general, the system 200 has an ability to collect information from multiple input sources and generate outputs, such as perform a cost-benefit analysis for a firmware or software update and suggest and/or initiate the update based on results of the cost-benefit analysis, for example when a relative benefit is greater than relative costs of the update. In other words, firmware/software updates are executed taking into consideration costs, such as electricity costs and network connectivity costs, as well as $CO_2$ emissions.

More specifically, the system 200 comprises at least one industrial device 210 comprising firmware, a central server 220 comprising at least one interface configured to collect and process data from a data source, and a wireless network 230, wherein the at least one industrial device 210 and the central server 220 are configured to communicate via the wireless network 230. FIG. 2 illustrates a wireless network 230, such as a cellular network or Internet. However, it should be noted that the described system 200 and associated method are applicable to other networks, for example wired networks, such as Ethernet (fiber optic cables etc.).

The at least one industrial device 210, i.e., target device, can be for example an electric charging device, such as an electric vehicle charging station or an electric charging wall. The mobile connections 230 are secure connections that are encrypted by one or more security protocols to ensure security of the data flowing between the different systems.

The central server 220 can be configured as a cloud server. In other examples, the central server 220 may not be a cloud server but a type of computer or server, such as a local server or remote server, a back-office server platform, a cluster controller platform, configured to perform the functions as described herein. In another exemplary embodiment, the central server 220 may be a computing platform, such as a distributed platform with components in different locations, e.g., a combination of cloud server and target device controller.

The at least one industrial device 210 comprise a controller 212 or some type of control/computing device that is configured to interact and exchange data and information with the central server 220, and to control a download and execution of a firmware or software update of the device 210.

The system 200 further comprises a cost-benefit-analysis module 300 configured via executable instructions to perform a cost-benefit analysis. The cost-benefit-analysis module 300 is herein also referred to as CBA module 300. The CBA module 300 is configured via executable instructions to calculate relative costs for a firmware update of the at least one industrial device 210 utilizing the data from the data source, determine a relative benefit for the firmware update of the at least one industrial device 210, compare the relative costs to the relative benefit, and suggest, initiate and/or deploy the firmware update to the at least one industrial device 210 when the relative benefit is greater than the relative costs with respect to the update. The CBA module 300 will be described in more detail in connection with FIG. 3.

In an embodiment, the central server 220 comprises the CBA module 300, i.e., an algorithm performed by the CBA module 300 is centralized, with the server 220 performing the analysis and suggesting or initiating an update for the at least one industrial device 210 based on the analysis. In another embodiment, the CBA module 300 and associated algorithm can be implemented in a distributed manner, for example distributed on the central sever 220 and the at least one industrial device 210, and/or other devices or systems.

With respect to a distributed manner of the CBA module 300, the cost-benefit analysis may be performed by the central server 220, but inference for the decision about when to attempt to initiate the update is done locally by the industrial device 210, based on for example additional data. Such additional data may include local limitations or factors relating specifically to the industrial device 210. Local temperature, electric grid fluctuations, maintenance activities etc. may be known to the industrial device 210, wherein the industrial device 210 is configured to recognize these events and/or record data relating to these events or circumstance and report back on these events to the central server 220. For example, a maintenance service scheduled for the device 210 may influence a decision to perform an update.

Figure 3:
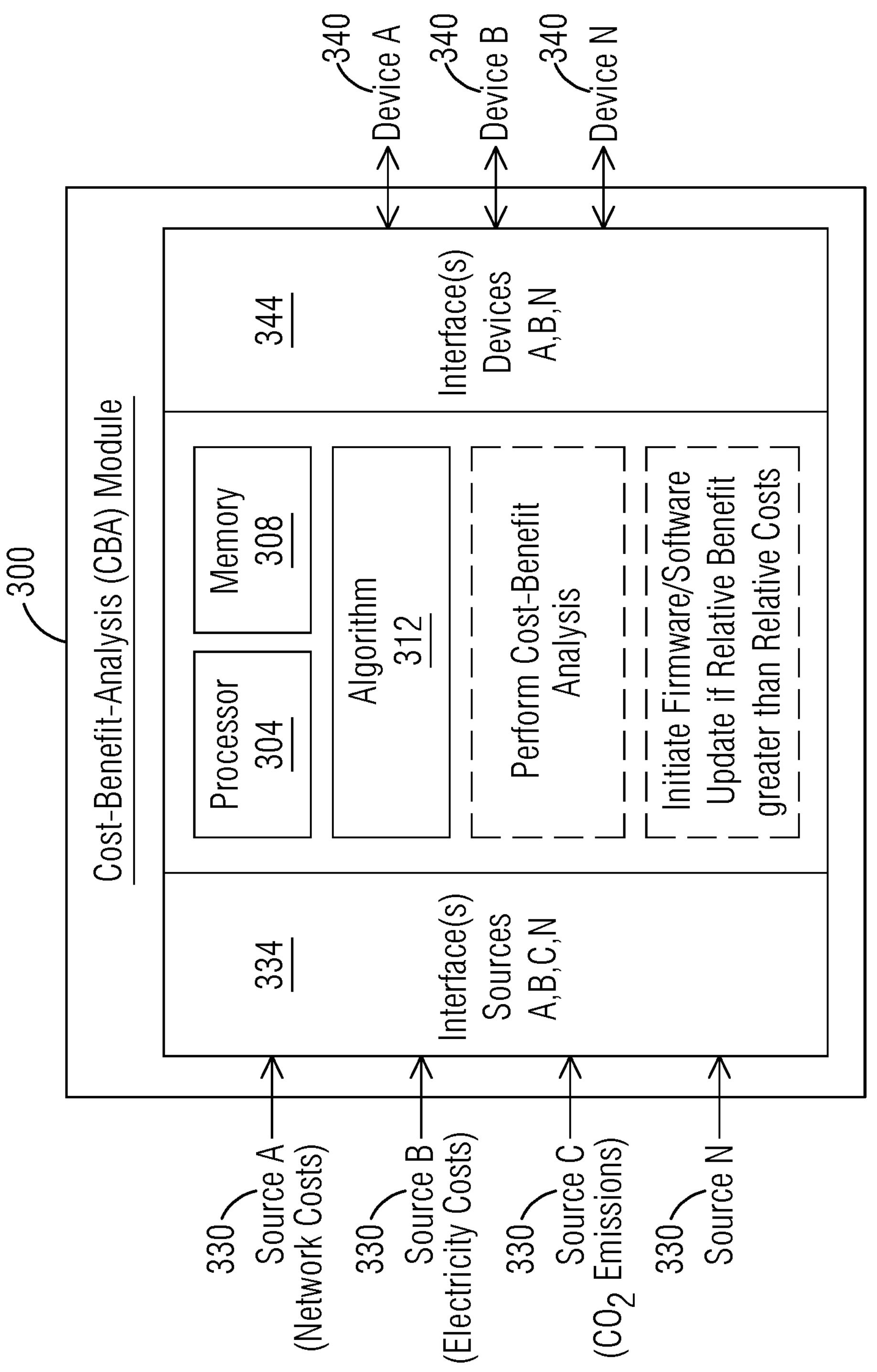
FIG. 3 illustrates a diagram of a cost-benefit-analysis (CBA) module in accordance with an exemplary embodiment of the present disclosure.

FIG. 3 illustrates a diagram of a CBA module 300 in accordance with an exemplary embodiment of the present disclosure. In an example, the module 300 is part of a system 200 as illustrated in FIG. 2 and can be a component of central server 220 and/or the at least one industrial device 210.

The CBA module 300 is operably coupled to or comprises one or more processor(s) 304 and memory(s) 308. In exemplary embodiments, the memory 308 may include any of a wide variety of memory devices including volatile and non-volatile memory devices, and the at least one processor 304 may include one or more processing units.

The CBA module 300 may be embodied as software or a combination of software and hardware. The CBA module 300 may be a separate module or may be an existing module programmed to perform a method as described herein. For example, the CBA module 300 may be incorporated, for example programmed, into an existing system or platform, such as server 220, by means of software.

In an exemplary embodiment of the present disclosure, the CBA module 300 further comprises an algorithm 312, which in combination with the processor 304 and memory 308, executes a method for a firmware update including a cost-benefit analysis. The module 300, i.e., algorithm 312, is configured to perform different calculations, determinations, and/or decisions, based on inputs from multiple input sources 330, e. g. source A, source B, source C and source N. It should be noted that there may be more input sources 330 than illustrated. The module 300 is configured to use any number of input sources 330, depending for example on availability or usefulness of sources. The data sources 330 are digital data sources, wherein each data source comprises a plurality of data and information relating to different aspects or topics. The data sources include for example websites or online sites that are freely available or may include sources provided by other parties.

Further, the CBA module 300 is configured to suggest, initiate or deploy a firmware/software update when a relative benefit outweighs, i.e., is greater, than relative costs for a specific update. Then, the update is at least suggested, in other examples also initiated, for example deployed, and then executed by a target device 340, such as target devices A, B, N, via one or more interface(s) 344, such as client-server interface(s). The target devices 340 can be industrial devices, such as electric charging device including an electric vehicle charging station or an electric charging wall. It should be noted that there may be more target devices 340 than illustrated in FIG. 3, that are in communication with the central server 220 and receive updates.

The system 300 comprises one or more interface(s) 334, generally configured to provide, for example to collect, obtain or receive, data from the data sources A, B, C and N. An example for an interface is a computing interface or software implemented interface which defines interactions between multiple software intermediaries. An example for a computing interface is an application programming interface (API), wherein the API interacts with separate software components or resources for providing, e.g., transferring or exchanging, data in an automated manner from the data sources 330 to the target application (CBA module 300).

The different data sources 330 provide information at least with respect to a) electricity costs, b) network connectivity costs and c) $CO_2$ emissions.

As noted earlier, firmware or software updates consume resources both in terms of network connectivity, e.g., cellular bandwidth, as well as electricity costs and $CO_2$ emissions derived from the electricity needed to perform the update. In some cases, the connectivity costs can be very high. The proposed solution optimizes firmware/software delivery to maximize benefits of such updates. The described system 200, module 300, and methods 400, 500 incorporate costs, such as electricity costs and network connectivity costs, and $CO_2$ emission (carbon offset) to maximize benefits and minimize costs for firmware or software updates.

The module 300, utilizing the algorithm 312, performs and executes a method for a firmware update, including a calculation or analysis of relative costs compared to a relative benefit for an update, as will be described with references to FIG. 4 and FIG. 5.

Figure 4:
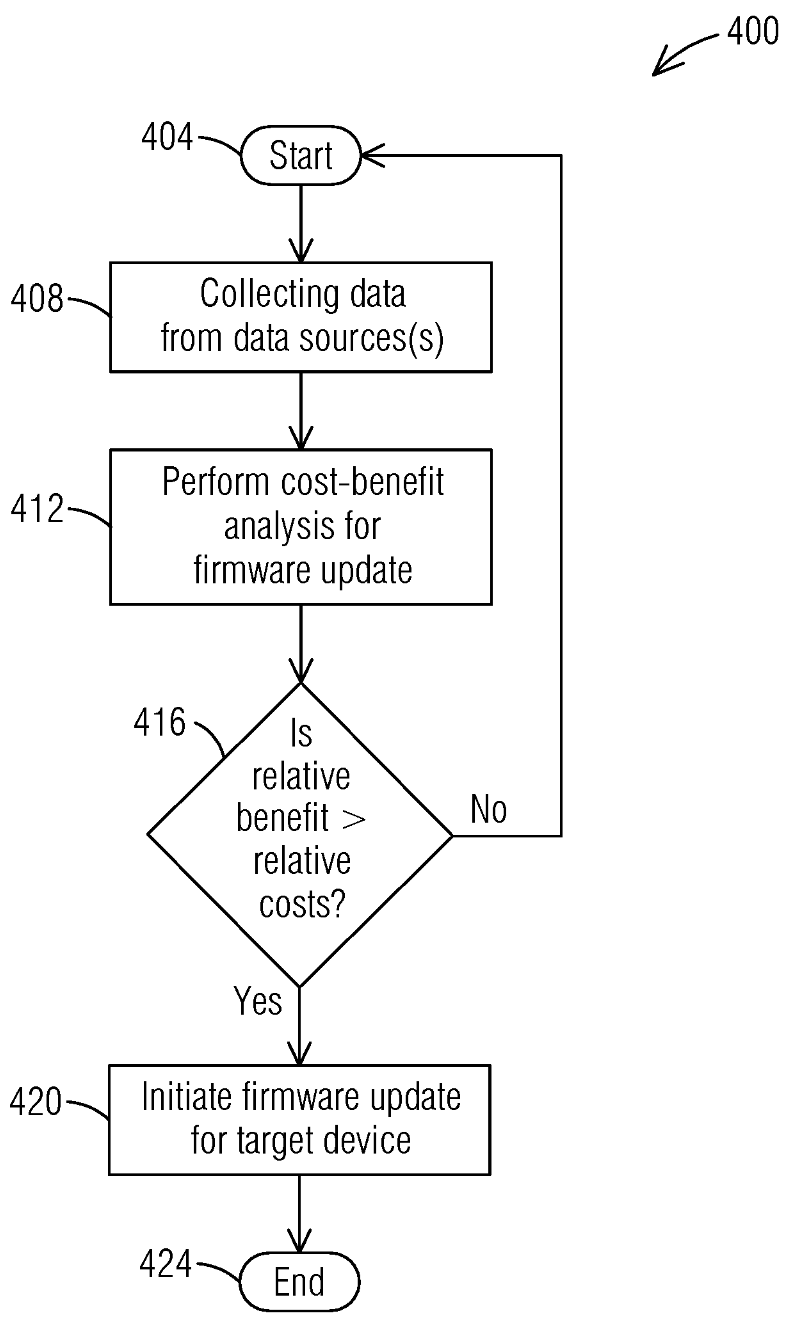
FIG. 4 and FIG. 5 illustrate flow charts of methods for a firmware update including cost-benefit analysis in accordance with an exemplary embodiment of the present disclosure.
Figure 5:
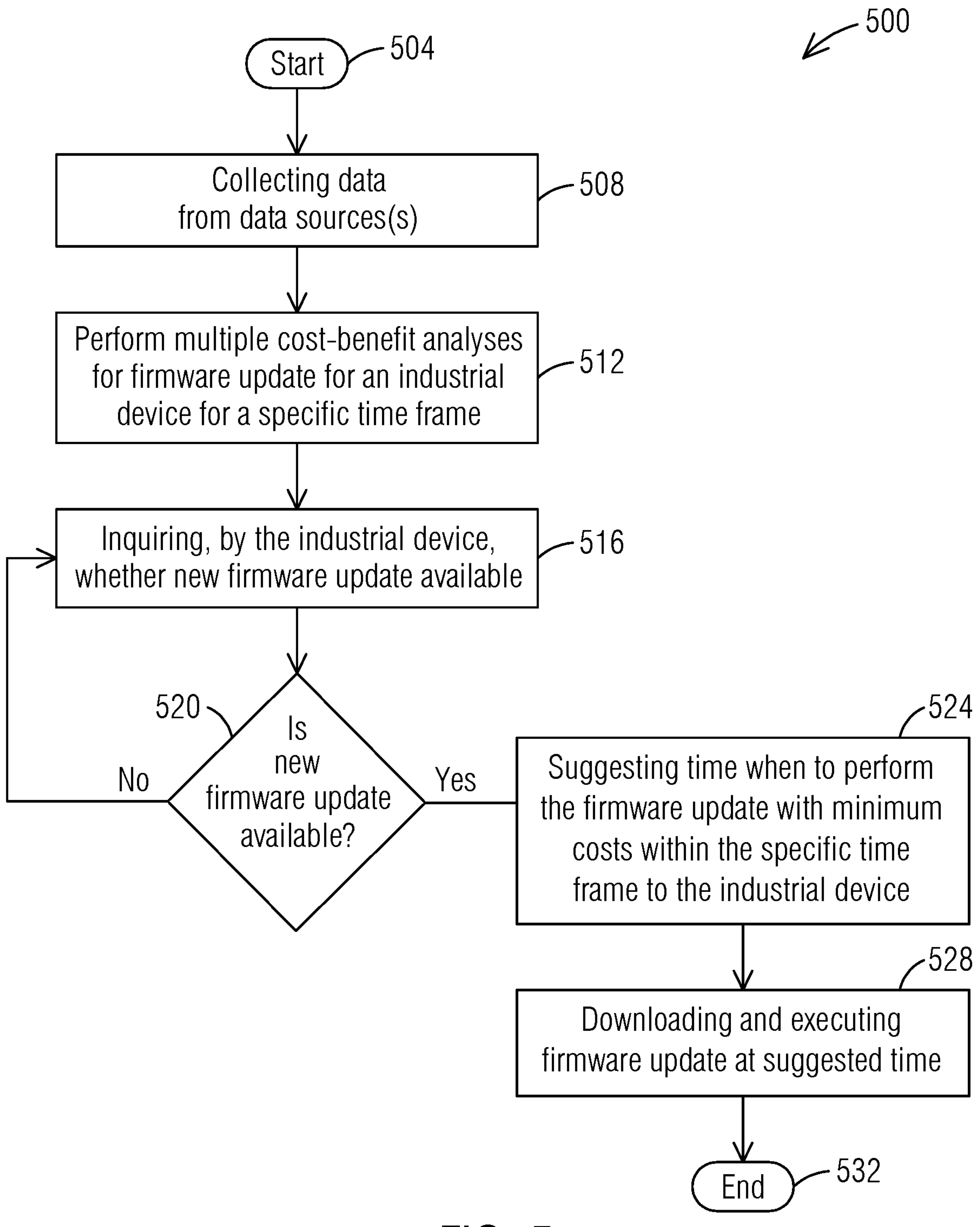

FIG. 4 and FIG. 5 illustrate flow charts of methods 400, 500 for firmware updates including cost-benefit analysis in accordance with exemplary embodiments of the present disclosure. The methods 400, 500 are performed by the CBA module 300 in connection with the central server 220 and the industrial device 210 (target device 340). The algorithm 312 of the CBA module 300 comprises methods 400 and 500.

While the methods 400, 500 are described as a series of acts or steps that are performed in a sequence, it is to be understood that the methods may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The methods 400 and 500 are based on utilizing a cellular network (telecommunications network), and wherein the target device is an electric vehicle charger, herein simply referred to as charger 210.

The method 400 may start at 404/504 and comprises, utilizing CBA module 300 with processor 304 and memory 308, act 408/508 of collecting data from a data source, typically multiple data sources such as sources A, B and C. Act 412/512 comprises performing one or more cost-benefit analyses for a firmware update of the charger 210 utilizing the data from the data sources A, B and C. The cost-benefit analysis includes calculating relative costs for the firmware update based on the data from the data sources and determining a relative benefit for the firmware update of the charger 210. The data sources A, B and C comprise at least data relating to electricity costs, network connectivity costs and $CO_2$ emissions. However, it should be noted that additional data may be considered for the cost-benefit analysis, such as specific configurations or conditions of the charger 210.

With reference to FIG. 4, decision 416 comprises comparing relative costs to a relative benefit of the cost-benefit analysis and act 420 comprises initiating the firmware update for the charger 210 when the relative benefit is greater than the relative costs for the firmware update of the charger 210. At 424, the method may end.

The method 500 is based on the method 400 and includes additional steps. The methods 400 and 500 are described now in more detail.

Relative Costs

Network Costs (Source A)

a) Cellular connectivity is not free and is metered by the charger 210. In addition, the cellular connectivity can be monitored/metered by the central server 220 ('backend') through a connection to the SIM card management system. For example, a cellular connection is metered in a monthly plan.

b) The charger's monthly connectivity/data consumption can be accurately predicted based on OCPP configurations of the server 220, for Samples Meter Intervals and Heartbeat, together with the typical traffic in that charger location. The Open Charge Point Protocol (OCPP) is an open-source communication standard for electric vehicle charging stations and network software companies. In other words, the charger 210 and server 220 are OCPP-compliant and thus, based on the OCPP settings, cellular network information can be obtained.

c) Every new firmware (or software) bundle has an incremental update size calculated based on the current firmware bundle version in the charger that is being replaced. The server is configured such that the existing bundle version is known to the server 220 and to the charger 210, or obtainable when needed.

d) The bundle data transmission cost of the new firmware update is calculated based on its bundle size and expected monthly cellular data for the charger 210 to download the bundle.

Electricity Costs (Source B)

e) The server 220 is configured such that it comprises, e.g., collects, electricity costs in both the location of the server 220 as well as the location of the charger 210. For example, the electricity costs of the server 220 are typically known to the operating company of the server 220. With respect to the charger 210, a user/client of the charger 210 can enter the electricity costs, for example $X/kWh, as part of a charger configuration.

$CO_2$ Emissions (Source C)

f) The server 220 is configured to comprise or receive $CO_2$ emissions data in connection with generating electricity in both locations of the server 220 and the charger 210. Such $CO_2$ emissions data are available on regional carbon intensity data websites. For example, the Greenhouse Gas Reporting Program (GHGRP) of the United States Environmental Protection Agency (EPA) collect greenhouse gas (GHG) and other relevant information from large GHG emissions sources, fuel and industrial gas suppliers, and $CO_2$ injections sites in the United States. $CO_2$ is the primary GHG emitted through human activities. The reported and collected data are made available to the public.

$CO_2$ emissions economic costs are expressed by costs to offset these $CO_2$ emissions, also referred to carbon offset and carbon offset credit, using for example a method such as a Renewable Energy Certificate (REC) that represents property rights to the environmental, social, and other non-power attributes of renewable electricity generation. RECs are issued for example by the EPA when one megawatt-hour (MWh) of electricity is generated and delivered to the electricity grid from a renewable energy source.

Relative Benefit g) Every firmware or software bundle has a relative benefit that can be expressed in the same monetary currency as the connectivity, power, and $CO_2$ emissions offset. In an example, the CBA module 220 is configured to calculate such a relative benefit, or relative benefits are pre-calculated and stored. Relative benefits are different depending on the type of firmware update and the target device (charger 210).

For example, a firmware update that includes updates relating to encryption, may not be beneficial to a charger that does not use data encryption, whereas such an update is very beneficial to a charger that does use encryption. Firmware updates that include a security update, provide a great relative benefit for most chargers, because it increases security. A firmware update that fixes bugs relating to ethernet transmission may only be beneficial to chargers that utilize Ethernet.

In summary, the relative benefit of a firmware update is based on a use case, depending on a configuration of the target device (charger 210). All these different use cases and associated relative benefits along with monetary value may be collected in a database and available to the CBA module 300 for the cost-benefit analysis. In another example, the CBA module 300 may directly calculate the relative benefit considering the configuration of the charger 210, when performing the analysis.

Cost-Benefit Analysis h) The firmware bundle relative cost schedule is calculated by the size of the bundle relative to the bundle it replaces, driving an amount of time it would take to transmit the bundle and electricity and $CO_2$ emissions offset required to transmit the bundle at different times, for example within a 24-hour window, utilizing data sources A, B and C, see acts 508, 512 of method 500.

For example, a firmware update may have the greatest benefit and/or lowest relative costs when executed on a specific day at a specific time, e.g., Monday at 6:00 am EST, compared to an update at 6:00 pm EST. Influencing factors can be different electricity costs and different $CO_2$ emissions at different times of a day.

i) In an embodiment, the charger 210 inquires the server 220 periodically (for example once a day, once every 12 hours, or when coming from offline to online for a long period, etc.) whether a new firmware version is available, relative to the firmware version the charger 210 has currently installed, see act 516.

j) The server 220 then provides to the charger 210 when a new firmware bundle is present and the ideal (best) time to perform the firmware update based on a minimum value in the relative cost schedule, assuming that there is a time in the next 24 hours when the relative benefit is higher than the relative costs, see acts 520, 524. The charger 210 may then download and execute the updated at the suggested time, see act 528. If there is no ideal time to install the update when the relative benefit is greater than the relative costs, either no new firmware bundle is presented or a time for the update with lowest costs is suggested.

k) Optionally, an owner/operating company of the charger 210 may configure a maximum cost ("budget") they are willing to spend in average per month (considering only charger-side costs, not server-side costs), and firmware updates can be deferred until the budget for performing an update is met or present.

With respect to the implementation of the methods 400, 500 (algorithm 312), the data collected from the different data sources 330 can be ranked or weighed with respect to an importance/impact for the update. For example, $CO_2$ emissions data may be ranked higher (with more weight) than network connectivity costs, wherein the different rankings contribute differently to the overall analysis for the update. In another example, the different input data can be considered equally. In this embodiment, the algorithm 312 can be a machine learning (ML) algorithm that is trained and capable of ranking or weighing the data.

It should be noted that the collection of data can be integrated into the CBA module 300, e.g., performed by the module 300, or can be separate process or module, located for example in the central server 220. The collection of data can be performed recurrent in a scheduled manner, utilizing for example a scheduling mechanism. For example, data may be collected once a day or several times a day. Further, it should be appreciated that the described methods 400, 500 may include additional acts and/or alternative acts corresponding to the features described previously with respect to the system 200 and module 300 (see FIG. 2 and FIG. 3).

It should be appreciated that acts associated with the above-described methodologies, features, and functions (other than any described manual acts) may be carried out by one or more data processing systems, such as for example CBA module 300, via operation of at least one processor 304. As used herein, a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. As discussed previously, the module 300 and/or processor 304 that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

In addition, it should also be understood that a processor that is described or claimed as being configured to carry out a particular described/claimed process or function may correspond to the combination of the module 300/processor 304 with the executable instructions (e.g., software/firmware apps) loaded/installed into a memory (volatile and/or non-volatile), which are currently being executed and/or are available to be executed by the processor 304 to cause the processor 304 to carry out the described/claimed process or function. Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/claimed processor that is configured to carry out the particular processes and functions described/claimed herein.

Further, it should be understood, that reference to "a processor" may include multiple physical processors or cores that are configured to carry out the functions described herein.

It is also important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., software and/or firmware instructions) contained within a data store that corresponds to a non-transitory machine-usable, computer-usable, or computer-readable medium in any of a variety of forms. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, Julia, C, C #, C++, Scala, R, MATLAB, Clojure, Lua, Go or any other form of code that can be programmed/configured to cause at least one processor to carry out the acts and features described herein. Still further, results of the described/claimed processes or functions may be stored in a computer-readable medium, displayed on a display device, and/or the like.

The invention claimed is:

1. A system for a firmware update comprising:

at least one industrial device comprising firmware, a central server comprising at least one interface configured to collect and process data from a data source, a network, wherein the at least one industrial device and the central server are configured to communicate via the network, multiple interfaces configured to collect and process data from multiple data sources, wherein the multiple interfaces are configured as application programming interfaces (APIs), and a cost-benefit-analysis (CBA) module for performing a cost-benefit analysis, wherein the CBA module is configured via executable instructions to calculate relative costs for a firmware update of the at least one industrial device utilizing the data from the data source, determine a relative benefit for the firmware update of the at least one industrial device, and compare the relative costs to the relative benefit, wherein the multiple data sources comprise data relating to electricity costs, network connectivity costs and $CO_2$ emissions, wherein the central server is configured to collect the electricity costs in both a location of the central server and the at least one industrial device, wherein the electricity costs are collected based on electricity costs in $X/kWh, wherein the at least one industrial device is configured to meter the network connectivity, and the central server is configured to predict the network connectivity costs based on the metered network connectivity, wherein the network connectivity is metered by the at least one industrial device based on a bundle data transmission cost for the firmware update, wherein the bundle data transmission cost is calculated based on its bundle size and expected monthly cellular data for the at least one industrial device to download the bundle, wherein the central server is configured to receive $CO_2$ emissions data from publicly available data source including greenhouse gas (GHG), wherein the relative costs for the firmware update are calculated as firmware bundle cost by an incremental update size based on an existing firmware version that is being replaced in the at least one industrial device, wherein the firmware bundle cost is calculated by its bundle size relative to a previous bundle size that is being replaced, driving an amount of time that is required to transmit the bundle, and electricity and $CO_2$ emissions offset required to transmit the bundle at different times within a 24-hour window, and wherein the at least one industrial device is configured to inquire the central server periodically whether the firmware update is available, and the central server is configured to provide the firmware update to the at least one industrial device when the firmware update is available in conjunction with a time to perform the firmware update when the relative benefit is higher than the relative costs.

2. The system of claim 1, wherein the CBA module is implemented by the central server, or the at least one industrial device, or in a distributed manner by a combination of the central server and the at least one industrial device.

3. The system of claim 1, wherein the CBA module is configured to perform multiple costs-benefit analyses for the firmware update for a specific time frame.

4. The system of claim 3, wherein the CBA module is configured select and provide a specific time to the at least one industrial device when to perform the firmware update, wherein the specific time is based on a minimum value of the relative costs within the specific time frame.

5. The system of claim 1, wherein the multiple interfaces are configured to provide data recurrently in a scheduled manner utilizing a scheduling mechanism.

6. The system of claim 1, wherein the CBA module comprises an algorithm and is configured via executable instructions to perform the cost-benefit analysis by implementing the algorithm in combination with input parameters and/or limitations.

7. The system of claim 1, wherein the at least one industrial device is an electric vehicle charging device.

8. A method for a firmware update comprising:

collecting data from multiple data sources, performing a cost-benefit analysis for a firmware update of at least one industrial device utilizing the data from the multiple data sources, and suggesting or initiating the firmware update for the at least one industrial device when a relative benefit is greater than relative costs for the firmware update, wherein the collecting comprises collecting data via multiple application programming interfaces (APIs), and wherein the multiple APIs are configured to provide data recurrently in a scheduled manner utilizing a scheduling mechanism, wherein the multiple data sources comprise at least data relating to electricity costs, network connectivity costs and $CO_2$ emissions, wherein the electricity costs are collected in both a location of a central server and at least one industrial device, wherein electricity costs are collected based on electricity costs in $X/kWh, wherein the network connectivity is metered by the at least one industrial device and the network connectivity costs are predicted by the central server based on the metered network connectivity, wherein the network connectivity is metered by the at least one industrial device based on a bundle data transmission cost for the firmware update, wherein the bundle data transmission cost is calculated based on its bundle size and expected monthly cellular data for the at least one industrial device to download the bundle, wherein the $CO_2$ emissions data are received by the central server from publicly available data source including greenhouse gas (GHG), wherein the relative costs for the firmware update are calculated as firmware bundle cost by an incremental update size based on an existing firmware version that is being replaced in the at least one industrial device, wherein the firmware bundle cost is calculated by its bundle size relative to a previous bundle size that is being replaced, driving an amount of time that is required to transmit the bundle, and electricity and $CO_2$ emissions offset required to transmit the bundle at different times within a 24-hour window, and wherein the at least one industrial device is configured to inquire the central server periodically whether the firmware update is available, and the central server is configured to provide the firmware update to the at least one industrial device when the firmware update is available in conjunction with a time to perform the firmware update when the relative benefit is higher than the relative costs.

9. The method of claim 8, wherein the collecting, performing, and initiating is performed by a cost-benefit-analysis (CBA) module implemented in a central server, or in the at least one industrial device, or in a distributed manner in the central server and the at least one industrial device.

10. The method of claim 8, further comprising:

performing multiple cost-benefit analyses for the at least one industrial device for a specific time frame.

11. The method of claim 8, further comprising:

selecting and providing a specific time to the at least one industrial device when to perform the firmware update, wherein the specific time is based on a minimum value of the relative costs within the specific time frame.

12. The method of claim 8, wherein the performing the cost-benefit analysis comprises implementing an algorithm utilizing the data source in combination with input parameters and/or limitations.

13. The method of claim 8, wherein the at least one industrial device is an electric vehicle charging device.

14. A non-transitory computer readable medium encoded with processor executable instructions that when executed by at least one processor, cause the at least one processor to carry out a method for a firmware update as claimed in claim 8.

* * * * *